United States Patent
Kobayashi

(10) Patent No.: US 8,731,775 B2
(45) Date of Patent: May 20, 2014

(54) ELECTRIC POWER STEERING APPARATUS

(75) Inventor: Hiroaki Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 12/990,867

(22) PCT Filed: May 15, 2009

(86) PCT No.: PCT/JP2009/002134
§ 371 (c)(1),
(2), (4) Date: Dec. 1, 2010

(87) PCT Pub. No.: WO2009/139180
PCT Pub. Date: Nov. 19, 2009

(65) Prior Publication Data
US 2011/0093164 A1  Apr. 21, 2011

(30) Foreign Application Priority Data
May 16, 2008 (JP) .................................. 2008-129877

(51) Int. Cl.
*B62D 5/04* (2006.01)
*G06F 7/00* (2006.01)

(52) U.S. Cl.
USPC ............. 701/41; 701/29.2; 180/443; 180/446

(58) Field of Classification Search
USPC ........... 701/41, 43, 29.1, 29.2, 34.4; 180/446, 180/6.44, 6.28, 412, 443
See application file for complete search history.

(56) References Cited

U.S. PATENT DOCUMENTS

| 6,018,691 | A  | * | 1/2000 | Yamamoto et al. ............. 701/41 |
| 6,496,762 | B2 |   | 12/2002 | Kurishige et al. |
| 6,889,794 | B2 | * | 5/2005 | Higashira et al. ............. 180/444 |
| 2002/0019690 | A1 | * | 2/2002 | Kurishige et al. .............. 701/41 |
| 2002/0179362 | A1 | * | 12/2002 | Norman et al. .............. 180/446 |
| 2005/0121252 | A1 | * | 6/2005 | Tsuchiya ...................... 180/446 |
| 2007/0282500 | A1 | * | 12/2007 | Kouchi et al. .................. 701/41 |
| 2008/0078608 | A1 | * | 4/2008 | Hara et al. .................... 180/446 |
| 2008/0097671 | A1 | * | 4/2008 | Kojo et al. ...................... 701/43 |
| 2010/0286871 | A1 | * | 11/2010 | Kobayashi et al. ............. 701/41 |

FOREIGN PATENT DOCUMENTS

| EP | 1 127 775 A1 | 8/2001 |
| JP | 2002-104218 A | 4/2002 |
| JP | 2003-285762 A | 10/2003 |
| JP | 2003-291842 A | 10/2003 |

(Continued)

*Primary Examiner* — Christine Behncke
(74) *Attorney, Agent, or Firm* — Carrier Blackman & Associates, P.C.; William D. Blackman; Michael J. McCandlish

(57) ABSTRACT

[Object] An electric power steering apparatus capable of returning the steering wheel to a steering wheel neutral position even in case of failure of a steering angle sensor.
[Solution] In performing a control action whereby the steering wheel is returned to a neutral position according to the steering angle and yaw rate, the gain of the yaw rate sensor (13) is amplified if a failure in the steering angle sensor (12) is detected, and the damping gain of a damping compensation unit (23) is reduced if failure in at least one of the sensors is detected. Thereby, the steering wheel (1) can return to the neutral position by producing a stronger returning force based on an amplified detection value even if the real yaw rate is small, and the damping component acting on the returning force can be reduced so that the self-aligning torque is enabled to return the steering wheel to the neutral position.

15 Claims, 2 Drawing Sheets

(56) References Cited

FOREIGN PATENT DOCUMENTS

| | | | |
|---|---|---|---|
| JP | 2003276631 A | 10/2003 |
| JP | 2004-299519 A | 10/2004 |
| JP | 2005-067262 A | 3/2005 |
| JP | 2006-256425 A | 9/2006 |

* cited by examiner

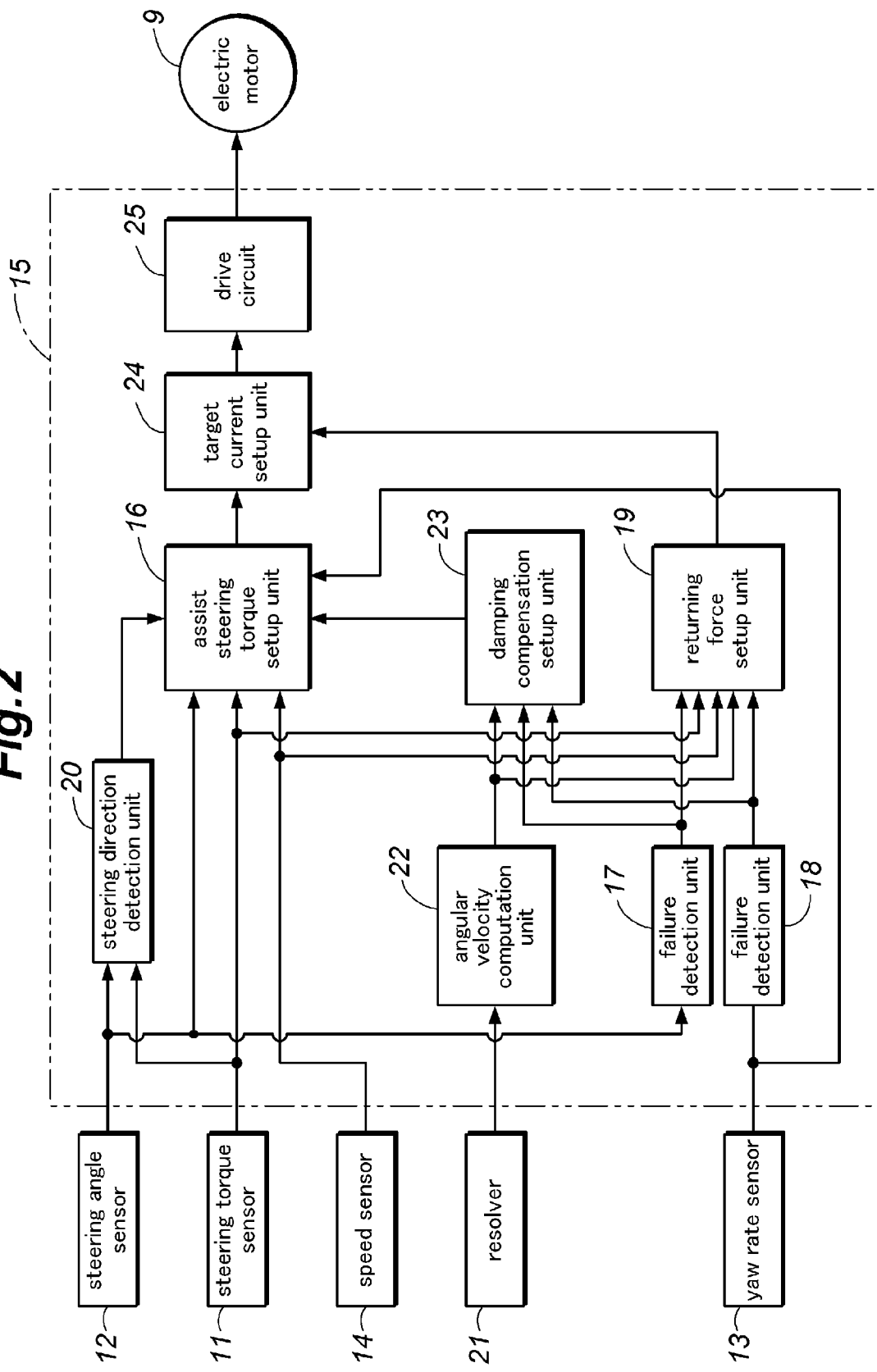

ELECTRIC POWER STEERING APPARATUS

TECHNICAL FIELD

The present invention relates to an electric power steering apparatus that performs a control action such that an assisting torque for steering steerable road wheels of a vehicle is produced by an electric motor in dependence on the steering of a steering wheel.

BACKGROUND OF THE INVENTION

An electric power steering apparatus that performs a control action such that an assisting torque for steering steerable road wheels of a vehicle is produced by an electric motor in dependence on the steering of a steering wheel is conventionally known. As the control action performed by the electric power steering apparatus is mainly based on the magnitude of the steering angle in relation to the steering wheel neutral position (straight-ahead condition), a proper assisting steering torque cannot be obtained when the steering angle sensor for detecting the steering angle has become faulty or otherwise unable to operate normally. It was previously proposed to stop the drive of the electric motor altogether upon occurrence of such an abnormal condition (See patent document 1 and 2, for instance).
[Patent document 1, Japan laid open patent 2002-104218]
[Patent document 2, Japan laid open patent 2005-67262]

When the drive of the electric motor is stopped due to an occurrence of a failure, the returning force to return the steering wheel to the neutral position will have to depend on the self-aligning torque that is produced by the suspension geometry of the vehicle, and acts as a returning force to restore the steerable road wheels to the straight-ahead condition.

In an electric steering power apparatus, the torque transmission mechanism such as a gearbox is interposed between the steering wheel and the knuckle arms of the steerable road wheels, and the friction such as that of the gearbox affects the returning force to restore the straight-ahead condition. In case of a relatively large steering angle, the self-aligning torque is significantly larger than the friction, but when the angle is within a small range around the steering wheel neutral position, the self-aligning torque may become smaller than the friction.

In the normal case, the control action applied to the electric motor to create a returning force to return the steering wheel to its neutral position is performed until the detected value of the steering angle by the steering angle sensor becomes equal to a value corresponding to the neutral position of the steering wheel (zero degree steering angle). However, in the case of a failure of the steering angle sensor, the control action based on the steering angle detection value is not possible, and the only available returning force will be the self-aligning torque such that the steering wheel may not be able to return to its neutral position when there is a region of a relatively high friction.

BRIEF SUMMARY OF THE INVENTION

A primary object of this invention is to provide an electric power steering apparatus capable of returning the steering wheel (1) to the neutral position even in the case of a sensor failure. To achieve such an object, the present invention provides an electric power steering apparatus including a steering force control unit (15) that causes an electric motor (9) to generate an assisting steering torque when steering steerable road wheels (6) in dependence on a steering of a steering wheel (1), the apparatus comprising: a steering angle sensor (12) for detecting a steering angle of the steering wheel (1), and a yaw rate sensor (13) for detecting a yaw rate of a vehicle; wherein the steering force control unit (15) performs a return control for the steering wheel (1) according to the detected steering angle and yaw rate when the steering wheel (1) is being returned towards a neutral position, and includes a failure detection unit (17) for detecting a failure of the steering angle sensor (12); and upon detection of a failure in the steering angle sensor (12), the steering force control unit (15) performs the return control in an amplified manner according to the yaw rate detected by the yaw rate sensor (13) as compared to a case where the steering angle sensor (12) is functioning normally.

In particular, the return control may comprise a control action to increase and decrease a returning force of the steering wheel (1), and upon detection of a failure in the steering angle sensor (12), the steering force control unit (15) increases the returning force based on the yaw rate detected by the yaw rate sensor (13) as compared to a case where the steering angle sensor (12) is functioning normally.

Furthermore, the electric power steering apparatus may further comprise a damping compensation setup unit (23) that applies a damping compensation to the assisting steering torque, the steering force control unit (15) further comprising a failure detection unit (15) for detecting a failure in the yaw rate sensor (13), and reducing the damping compensation applied by the damping compensation setup unit (23) upon detection of a failure in at least one of the steering angle sensor (12) and yaw rate sensor (13).

Also, when the steering angle sensor (12) and the yaw rate sensor (13) are both normal, and the yaw rate detected by the yaw rate sensor (13) is below a prescribed value, the contribution of the returning force based on the steering angle detected by the steering angle sensor (12) may be substantially greater than that based on the yaw rate detected by the yaw rate sensor (13).

EFFECT OF THE INVENTION

According to the invention, by controlling the electric motor such that a returning force is produced for the steering wheel according to a yaw rate resulting from a cornering movement and, in case of a failure of the steering angle sensor, performing a return control according to the yaw rate, in particular by increasing the returning force of the steering wheel, an amplified returning force can be obtained so that the steering wheel can be returned to the neutral position without any difficulty even when the actual yaw rate is small.

According to claim 3, in case of a failure in at least one of the steering angle sensor and the yaw rate sensor, the damping gain in the return control is reduced. Therefore, the damping control used for improving the steering feel is reduced or, in other words, the damping acting on the returning movement of the steering wheel to the neutral position can be reduced so that the steering wheel is enabled to return to the neutral position by the self-aligning torque.

According to claim 4, when the yaw rate is below the prescribed value such as when the speed of the vehicle is low and below a prescribed value and the steering wheel is near the neutral position, the contribution of the returning force based on the steering angle detected by the steering angle sensor is substantially greater than that based on the yaw rate detected by the yaw rate sensor. Therefore, near the steering wheel neutral position where the influence from the friction of the torque transmitting mechanism such as a gear box is significant, the contribution from the steering angle can return the steering wheel to the neutral position although the contribution from the yaw rate is very small.

According to claim 5, even if a special electronic circuit is not employed to directly determine the presence and absence of failure according to the detected signal of the steering sensor, the detection of failure may be performed by comparison of the detected signal of the steering sensor to the detected signal of the yaw rate sensor, and this allows the electronic circuit of the failure detection unit to be simplified.

BRIEF DESCRIPTION OF THE DRAWINGS

FIG. 2 is a control block diagram according to the present invention.

DETAILED DESCRIPTION OF THE PREFERRED EMBODIMENTS

Figure 1:
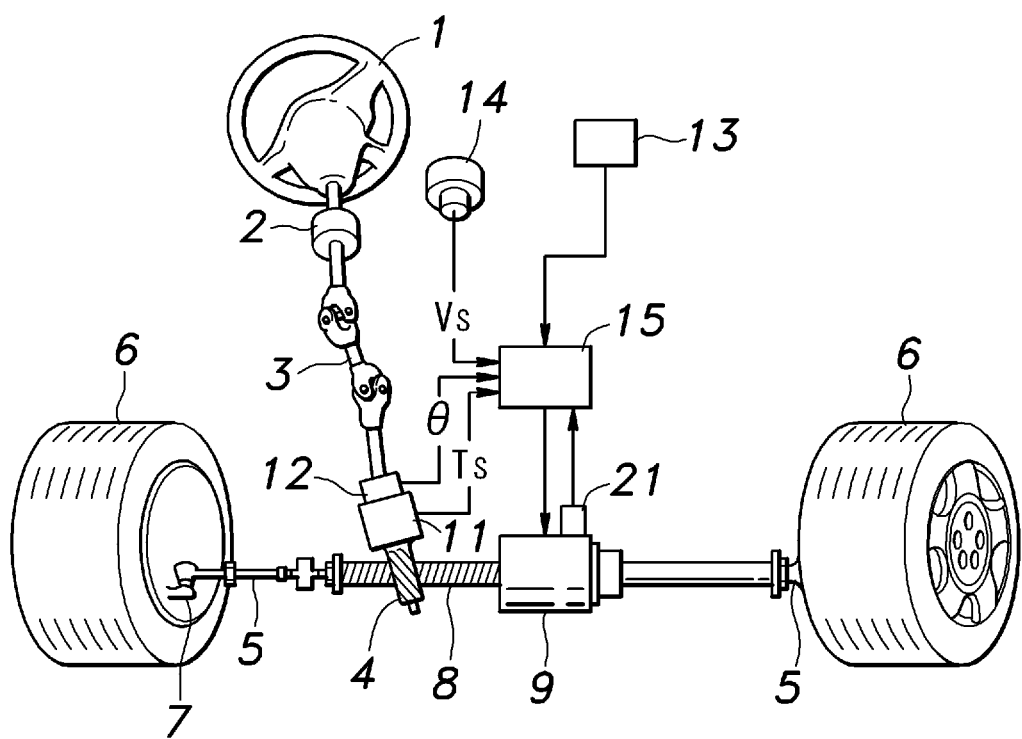
FIG. 1 is a diagram showing the overall configuration of a vehicle power steering apparatus according to the present invention.

An embodiment of the present invention will now be described in the following with reference to the accompanying drawings. FIG. 1 is a diagram showing the overall configuration of the vehicle power steering apparatus according to the present invention. Illustrated in the drawing is a per se known rack and pinion mechanism that comprises a steering shaft 2 having a steering wheel 1 coaxially and integrally connected thereto, a pinion 4 connected to the steering shaft 2 via a coupling shaft 3 including a universal joint, a rack 8 configured to move laterally back and forth with respect to the vehicle body and meshing with the pinion 4, and a pair of tie rods 5 that connect the two ends of the rack 8 to knuckle arms 7 of the corresponding front steerable road wheels 6. An electric motor 9 is coaxially incorporated in a middle portion of the rack 8 for the purpose of producing an assisting steering torque that reduces the required manual steering effort to be applied to the rack and pinion mechanism.

The power steering apparatus comprises a steering torque sensor 11 that detects the steering torque acting on the pinion 4, a steering angle sensor 12 that detects the rotational angle (steering angle) of the steering wheel 1 at the rack and pinion assembly, a yaw rate sensor 13 that detects the yaw rate of the vehicle, a speed sensor 14 that outputs the speed signal corresponding to the traveling speed of the vehicle, and a control unit 15 serving as a steering force control unit for controlling the output of the electric motor 9 according to the detected values of the sensors. The yaw rate sensor 13 produces a zero signal in the straight-ahead condition, and outputs a detected value of either plus or minus sign depending on the direction of the yaw movement.

The mode of control in the control unit 15 is described in the following with reference to the control block diagram of FIG. 2. The control unit 15 includes an assist steering torque setup unit 16 which receives the steering angle signal detected by the steering angle sensor 12, the steering torque signal Ts detected by the steering torque sensor 11 and the speed signal Vs detected by the speed sensor 14.

The steering torque signal Ts includes information of the magnitude of the steering torque and the direction of the torque. The torque direction may be expressed with the plus or minus sign, wherein the plus sign expresses the direction of the steering torque in the clockwise direction and the minus sign expresses the direction of the steering torque in the counter clockwise direction.

The steering angle signal θ is forwarded to a returning force setup unit 19 via a failure detection unit 17 that detects the failure of the steering angle sensor 12 while the yaw rate signal γ is forwarded to the returning force setup unit 19 via the failure detection unit 18 that detects the failure of the yaw rate sensor 13. In the failure detection units 17 and 18, the detected signals of the steering angle θ and the yaw rate γ, respectively, are determined to be faulty or not. The failure of the steering angle sensor 12 may also be determined according to the signal of the steering angle θ and the signal of the yaw rate γ. For instance, by preparing a map that associates each given steering angle θ with the value range of the yaw rate γ expected from the given steering angle θ, the failure of the yaw rate sensor can be detected if the output of the yaw rate sensor deviates from the expected range of the yaw rate γ.

The signal of the yaw rate γ is also forwarded to the assist steering torque setup unit 16. The assist steering torque setup unit 16 determines if the yaw rate signal γ is below a prescribed value or not. The yaw rate signal γ may be below the prescribed value when the speed of the vehicle is below a prescribed value (or in a low speed range if the vehicle speed is classified into a low, medium and high speeds) and the steering angle θ is below a prescribed value (near the steering wheel neutral position).

The returning force setup unit 19 determines the returning force control value for the control action of the electric motor 9 to generate the returning force that urges the steering wheel 1 to the neutral position (θ=zero degrees). As mentioned above, the returning force setup unit 19 receives the detection signals θ and γ from the steering angle sensor 12 and yaw rate sensor 13, and forwards a return force setup value that decreases and increases depending on the detection signals to the target current setup unit 24.

Also, the steering angle signal θ and the steering torque signal Ts are forwarded to a steering direction detection unit 20, and according to the signals of θ and Ts, the steering direction detection unit 20 determines if the steering direction is a direction to move away from or a direction to return to the steering wheel neutral position and then forwards its output to the assist steering torque setup unit 16.

Also, the electric motor 9 is provided with a resolver 21 for detecting the angular speed of the electric motor 9. An angular velocity computation unit 22 computes the electric motor angular speed from the output signal of the resolver 21. The computed angular speed is then forwarded to the assist steering torque setup unit 16 via a damping compensation unit 23. The damping compensation unit 23 compensates the target current of the electric motor 9 in the rotative actuation thereof so as to account for the required damping force. In case of normal steering in which the direction of the steering torque and the direction of rotation of the electric motor 9 are the same (normal steering), the damper attenuation with respect to the steering torque is a subtraction correction. On the other hand, when the direction of the steering torque is opposite to the direction of rotation of the electric motor 9 (returning steering) such as when the steering wheel 1 is being returned to the neutral position due to the self-aligning torque, the damper attenuation with respect to the steering torque is an addition correction. The failure detection signals from the failure detection units 17 and 18 are also forwarded to the damping compensation unit 23.

The assist steering torque setup unit 16 computes the assisting steering torque value in the normal steering according to the detected output signals of the steering angle sensor 12 and the yaw rate sensor 13, and computes the assisting steering torque setup value that takes into account the compensation value provided by the damper compensating unit 23 before the assisting steering torque setup value is forwarded to the target current setup unit 24. The target current setup unit 24 outputs a drive current value corresponding to the computed assisting steering torque setup value to the electric motor 9 via the drive circuit 25 to drive control the electric motor 9.

The failure detection units 17 and 18 determine the presence or absence of abnormality in the steering angle signal θ and the yaw rate signal γ respectively, while the return force setup unit 19 checks the presence and absence of a failure detection signal from the failure detection units 17 and 18. Also, the returning force setup unit 19 receives the signals from the steering torque signal Ts, the vehicle speed signal Vs, and the resolver signal. When the signals from failure detection units 17 and 18 do not indicate any abnormality, the returning force setup unit 19 determines the returning force according to the steering angle signal θ, yaw rate signal γ, steering torque signal Ts, vehicle speed signal Vs and resolver signal. In the region where the self-alignment torque is relatively strong, because the yaw rate γ is relatively high, the returning force is amplified owing to the contribution of the high yaw rate γ, and the steering wheel 1 can be returned to the neutral position relatively quickly.

If failure occurred only in the steering angle sensor 12, in performing the returning force control action, the returning force setup unit 19 sets the steering angle signal θ to 0 angle, and computes the returning force solely according to the yaw rate γ. However, when the normal gain is used when computing the assisting steering torque value in such a time, only a relatively small returning force is obtained. Therefore, by increasing the gain (by 30%, for instance), the returning force control based on the yaw rate signal γ can be performed in an amplified manner as compared to the time when the steering angle sensor 12 is normal. Also, the gain (amplification factor) that is used for the computation when computing the returning force based on the yaw rate signal γ may consist of a fixed value or may be varied by using a map of amplification factor appropriately associated with the corresponding value range of the yaw rate γ. At any event, the computation of the amplified returning force may be performed by using an amplified amplification factor. Thereby, when the steering wheel is near the neutral position and the actual yaw rate is small, a relatively large returning force can be obtained, and a favorable steering wheel return control can be achieved. The gain of the damping control (damping gain) of the damping compensation unit 23 may be reduced when the steering wheel 1 is being returned to its neutral position. The same as with the above, when computing the damping gain based on the yaw rate signal γ, the computation may use a fixed gain or a variable gain that may depend on the value of the yaw rate γ while the yaw rate gain may be increased. Thereby, the effective dead zone area of the yaw rate sensor 13 in the region where the detected yaw rate signal γ is relatively small such as near the steering wheel neutral can be reduced, enabling the return control to effectively return the steering wheel to its neutral even when the steering angle sensor 12 has failed.

If failure occurred only in the yaw rate sensor 13, in performing the returning force control action, the returning force setup unit 19 sets the yaw rate signal γ to 0 rate, and computes the returning force solely according to the steering angle θ. The computation of the returning force control action in such a time does not take into account the contribution of the yaw rate γ. However, no significant inconvenience arises because, even if the yaw rate sensor should fail in a region where the effect of the yaw rate γ is significant, the self-aligning torque would be effective in such a region. Also, since the steering angle θ is detected, the returning force control action to return the steering wheel 1 to its neutral can be performed. For this case also, the gain (damping gain) of the damping control of the damping compensation unit 23 may be reduced when the steering wheel 1 is being returned to its neutral position. In this case also, when computing the damping gain based on the steering angle signal θ, the computation may use a fixed gain or a variable gain that depends on the steering angle θ. At any event, the gain for the returning force may be increased when computing the damping gain. Thereby, the contribution of the yaw rate γ is made up for or supplemented so that the return control when restoring the neutral position can be effectively achieved even when the yaw rate sensor 13 is faulty.

In case the sensors 12 and 13 are both faulty, the return force setup unit 19 will set the values of both the signals θ and γ to 0. In this case, because the return force setup unit 19 will not be able to perform the returning force control, the steering wheel 1 will be returned to its neutral position solely by means of the self-aligning torque just like a vehicle that does not have power steering apparatus. Therefore, the friction acting against the return force must be minimized as much as possible. To this end, the damping compensation unit 23 produces a control action to decrease the damping gain (by 30%, for instance) upon receiving the input of the failure occurrence signals from both the sensors 12 and 13. Thereby, the self-aligning torque will be free of the damping effect, enabling the steering wheel 1 to return to its neutral position. Since the damping effect will be acting also when the steering wheel 1 is in the normal steering, the damping gain may be reduced also when steering wheel 1 is in the normal steering by 20%, for instance.

The reduction control of the damping gain is applicable also when failure occurred in one of the above sensors 12 and 13. In case of failure in the steering angle sensor 12, the damping gain may be decreased by 30% when the steering wheel 1 is returning to the neutral position instead of increasing the gain of the yaw rate γ for the returning force. In case of failure in the yaw rate sensor 13, the damping gain may be increased by 20% when the steering wheel 1 is in the normal steering and decreased by 30% when the steering wheel is returning to the neutral position.

Furthermore, in case of failure of both the steering sensor 12 and the yaw rate sensor 13, if each of the output values of the sensors is abruptly reduced from relatively large values to 0, the force acting on the steering wheel may become so great that the vehicle operator may even experience some difficulty in holding onto the steering wheel. Therefore, when a sensor becomes faulty and the control action for increasing the gain is initiated, the gain may be increased gradually, instead of being increased abruptly. More specifically, such as in the case of failure of a sensor when the vehicle is traveling in the high-speed region, as a sudden increase of the gain will interfere with the behavior of the vehicle, the control action performed to increase the gain should be executed at a slower rate when in the high-speed region than when the vehicle is in the low-speed region such as when steering the vehicle in a stationary condition.

Also, in case the yaw rate signal γ is below a prescribed value, such as when the vehicle is traveling at low speed and the steering angle θ is small, the friction may be greater in magnitude than the self-aligning torque. It is desired that the steering wheel should be able to return to the neutral position. As discussed above, under such a condition, the assist steering torque setup unit 16 may determine if the value of the yaw rate γ is so small that the self-aligning torque is not adequate to return the steering wheel to the neutral position, and if such an occurrence is detected, the contribution to the returning force due to the steering angle is amplified in relation to that due to the yaw rate (by setting the ratio θ:γ=4:1, for instance). Thereby, the control action will be enabled to produce a

TERMS 1 steering wheel
6 steerable road wheels
9 electric motor
12 steering angle sensor
13 yaw rate sensor
15 control unit (steering force control unit)
17 failure detection unit
18 failure detection unit
23 damping compensation unit (damper compensation setup unit)

The invention claimed is:

1. An electric power steering apparatus including a steering force control unit that causes an electric motor to generate an assisting steering torque when steering steerable road wheels in dependence on a steering of a steering wheel, the apparatus comprising:
a steering angle sensor for detecting a steering angle of the steering wheel, a yaw rate sensor for detecting a yaw rate of a vehicle, and a steering torque sensor for detecting a steering torque;
wherein:
a steering direction is determined to be in a direction away from or toward a neutral position according to the steering angle and the steering torque, and the steering force control unit performs a return control for the steering wheel according to the detected steering angle and yaw rate when the steering wheel is being returned towards the neutral position, and includes a failure detection unit for detecting a failure of the steering angle sensor;
upon detection of a failure in the steering angle sensor, the steering force control unit performs the return control in an amplified manner according to the yaw rate detected by the yaw rate sensor as compared to a case where the steering angle sensor is functioning normally;
the return control comprises a control action to increase and decrease a returning force of the steering wheel, and upon detection of a failure in the steering angle sensor, the steering force control unit increases the returning force based on the yaw rate detected by the yaw rate sensor as compared to a case where the steering angle sensor is functioning normally; and
when the steering angle sensor and the yaw rate sensor are both normal, and the yaw rate detected by the yaw rate sensor is below a prescribed value, the contribution of the returning force based on the steering angle detected by the steering angle sensor is substantially greater than that based on the yaw rate detected by the yaw rate sensor.

2. An electric power steering apparatus including a steering force control unit that causes an electric motor to generate an assisting steering torque when steering steerable road wheels in dependence on a steering of a steering wheel, the apparatus comprising:
a steering angle sensor for detecting a steering angle of the steering wheel, and a yaw rate sensor for detecting a yaw rate of a vehicle;
wherein:
the steering force control unit performs a return control for the steering wheel according to the detected steering angle and yaw rate when the steering wheel is being returned towards a neutral position, and includes a failure detection unit for detecting a failure of the steering angle sensor; and upon detection of a failure in the steering angle sensor, the steering force control unit performs the return control in an amplified manner according to the yaw rate detected by the yaw rate sensor as compared to a case where the steering angle sensor is functioning normally;
the return control comprises a control action to increase and decrease a returning force of the steering wheel, and upon detection of a failure in the steering angle sensor, the steering force control unit increases the returning force based on the yaw rate detected by the yaw rate sensor as compared to a case where the steering angle sensor is functioning normally; and
when the steering angle sensor and the yaw rate sensor are both normal, and the yaw rate detected by the yaw rate sensor is below a prescribed value, the contribution of the returning force based on the steering angle detected by the steering angle sensor is substantially greater than that based on the yaw rate detected by the yaw rate sensor.

3. An electric power steering apparatus for a vehicle including a steering force control unit that causes an electric motor to generate an assisting steering torque when steering steerable road wheels in dependence on a steering of a steering wheel, the apparatus comprising:
a steering angle sensor for generating a steering angle signal $\theta$ depending on a steering angle of the steering wheel, wherein $\theta=0$ is a neutral position;
a yaw rate sensor for generating a yaw rate $\gamma$ depending on a yaw rate of the vehicle; and
a steering torque sensor for generating a steering torque signal Ts for detecting the direction and magnitude of a steering torque;
wherein:
a steering direction is determined to be in a direction away from or toward the neutral position according to the steering angle signal $\theta$ and the steering torque signal Ts;
the steering force control unit performs a return control for the steering wheel according to the steering angle signal $\theta$ and the yaw rate $\gamma$ based on a first yaw rate amplification factor when each of the steering angle sensor and the yaw rate sensor is operational and the steering direction is determined to be toward the neutral position; and
upon detection of a failure in the steering angle sensor, the steering force control unit performs the return control according to the yaw rate $\gamma$ based on a second yaw rate amplification factor wherein the second yaw rate amplification factor is larger than the first yaw rate amplification factor.

4. The apparatus according to claim 3 wherein the second yaw rate amplification factor is 30% larger than the first yaw rate amplification factor.

5. The apparatus according to claim 3, wherein the second yaw rate amplification factor is determined according to a map associating an appropriate value of the second yaw rate amplification factor to a corresponding value range of the yaw rate $\gamma$.

6. The apparatus according to claim 3 additionally comprising a steering angle sensor failure detection unit wherein the failure of the steering angle sensor is detected by the steering angle failure detection unit.

7. The apparatus according to claim 3 wherein the failure of the steering angle sensor is determined based on the steering angle signal $\theta$ and the yaw rate $\gamma$.

8. The apparatus according to claim 7 wherein the failure of the steering angle sensor is determined if the yaw rate $\gamma$ is outside of a range expected for a given value of the steering angle signal $\theta$.

9. The apparatus according to claim 3 further comprising:
a resolver for detecting an angular velocity of the electric motor;
a yaw rate failure detection unit for detecting a failure in the yaw rate sensor; and
a damping compensation setup unit;
wherein:
the damping compensation setup unit applies a damping compensation to the assisting steering torque, according to the steering angle signal $\theta$, the yaw rate $\gamma$ and the angular velocity of the electric motor; and
wherein, during a time that the steering direction is determined to be toward the neutral position and the steering angle sensor is operational, upon detection of a failure of the yaw rate sensor, the steering force control unit reduces the damping compensation applied by the damping compensation setup unit.

10. The apparatus according to claim 9 wherein, the damping compensation is determined using a first damping gain when the yaw rate sensor is operational, and a second damping gain upon detection of a failure of the yaw rate sensor, and the second damping gain depends on the steering angle signal $\theta$.

11. The apparatus according to claim 9 wherein, upon detection of a failure of the yaw rate sensor the damping compensation is reduced by 30%.

12. The apparatus according to claim 3 further comprising:
a resolver for detecting an angular velocity of the electric motor;
a yaw rate failure detection unit for detecting a failure in the yaw rate sensor; and
a damping compensation setup unit;
wherein:
the damping compensation setup unit applies a damping compensation to the assisting steering torque, according to the steering angle signal $\theta$, the yaw rate $\gamma$ and the angular velocity of the electric motor; and
wherein, during a time that the steering direction is determined to be toward the neutral position, upon detection of a failure of both the yaw rate sensor and the steering angle sensor, the steering force control unit reduces the damping compensation applied by the damping compensation setup unit.

13. The apparatus according to claim 12 wherein upon detection of a failure of both the yaw sensor and the steering angle sensor the damping compensation is reduced by 30%.

14. The apparatus according to claim 12 wherein, upon detection of a failure of both the yaw sensor and the steering angle sensor, change from the first yaw rate amplification factor to the second yaw rate amplification factor is performed gradually.

15. The apparatus according to claim 3, wherein when the steering angle sensor and yaw rate sensor are both operational, and the yaw rate detected by the yaw rate sensor is below a prescribed value, the contribution of the returning force based on the steering angle signal $\theta$ is substantially greater than that based on the yaw rate $\gamma$.

* * * * *